UNITED STATES PATENT OFFICE.

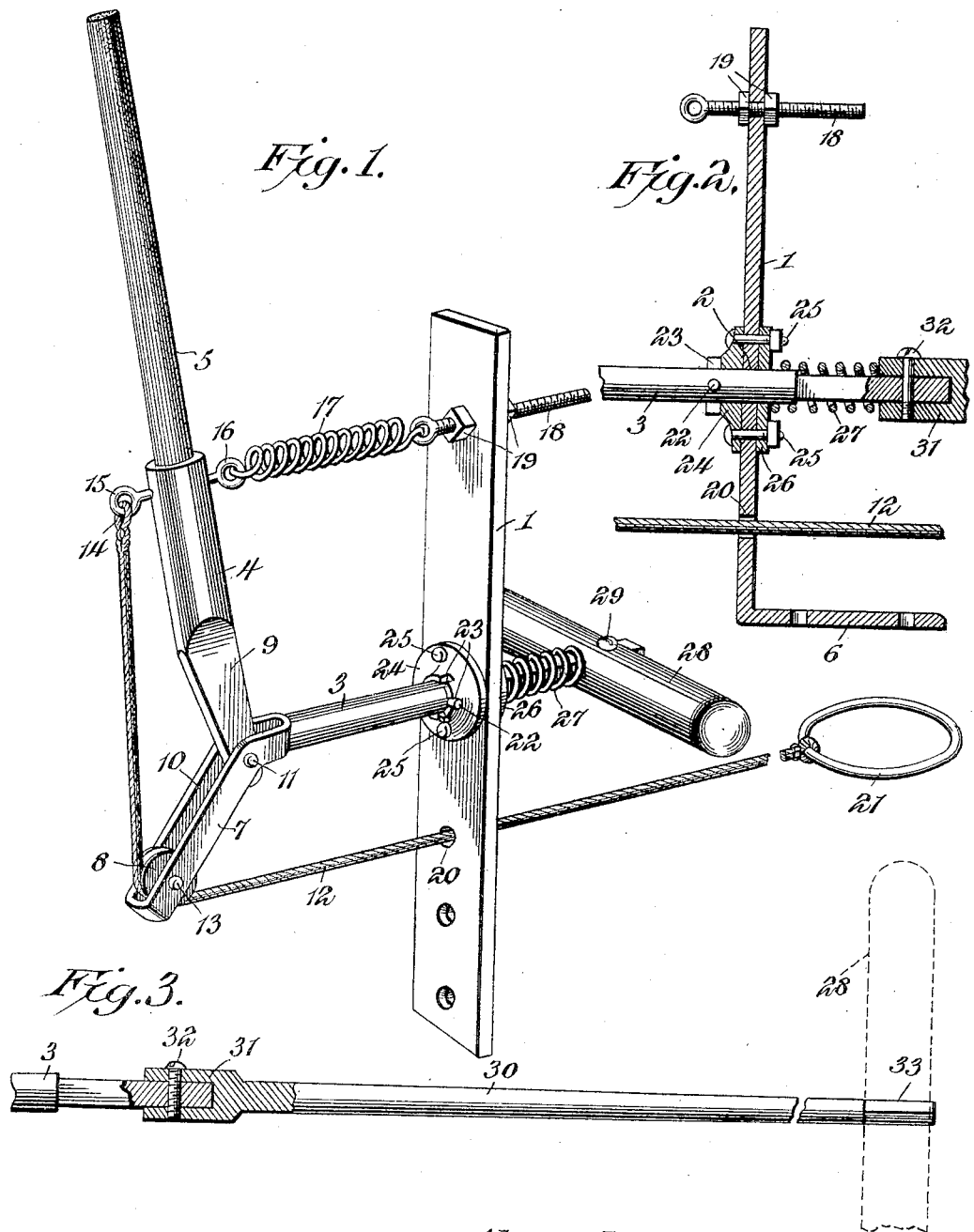

ALEXANDER BURROWS, OF WOODWARD, OKLAHOMA TERRITORY.

WHIP-OPERATING DEVICE.

No. 813,401.      Specification of Letters Patent.      Patented Feb. 27, 1906.

Application filed July 25, 1905. Serial No. 271,241.

*To all whom it may concern:*

Be it known that I, ALEXANDER BURROWS, a citizen of the United States, residing at Woodward, in the county of Woodward, Oklahoma Territory, have invented a new and useful Whip-Operating Device, of which the following is a specification.

The invention relates to improvements in whip-operating devices.

The object of the present invention is to improve the construction of whip-operating devices and to provide a simple and comparatively inexpensive one of great strength and durability designed for use on all kinds of vehicles, agricultural machinery, and the like and adapted to enable a whip to be first adjusted to position it properly with relation to the horse or other animal to be whipped and then oscillated to apply the whip to the animal.

A further object of the invention is to enable the whip after being adjusted to the desired position to be automatically locked in such position, so that it will be only necessary to oscillate the whip and not at the same time hold it in position, thereby giving greater freedom to the driver for controlling the team.

Another object of the invention is to provide a device of this character adapted to be easily applied to closed vehicles for enabling the whip to be applied or operated without exposing the driver to wind, rain, or cold.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a whip-operating device constructed in accordance with this invention and provided with a straight bracket or bar for attachment to a vehicle. Fig. 2 is a vertical sectional view of a portion of the device, the bracket or bar being L-shaped for attachment to a binder, rake, or the like. Fig. 3 is a detail view illustrating the construction of the extension-bar.

Like numerals of reference designate corresponding parts in all the figures of the drawings.

1 designates an upright bracket or bar provided with a bearing-opening 2 for the reception of a horizontal shaft or support 3, which carries a whip-holder 4 and which is capable of rotary movement to enable a whip 5 to be properly positioned with relation to the animal to be whipped. The bracket or bar 1 (illustrated in Fig. 2 of the accompanying drawings) has its lower attachment portion 6 bent at right angles and arranged horizontally to enable it to be conveniently mounted on a binder or other agricultural implement; but the lower end of the bar may, as illustrated in Fig. 1, be left straight when it is desired to secure it by clips or other suitable fastening devices to the hame of a lead-horse or to a vehicle. However, when the device is applied to a closed vehicle the bar may be omitted and the horizontal shaft or support 3 arranged in an opening of the front of the vehicle. As this arrangement is perfectly obvious, illustration thereof is deemed unnecessary.

The horizontal shaft or support 3, which extends longitudinally of the vehicle or machine to which it is applied, is provided at its front end with an angularly-disposed arm 7 and is slotted thereat to receive the lower end of the whip-holder 4 and a guide-pulley 8, which is located beyond and at a point below the whip-holder, as clearly illustrated in Fig. 1 of the drawings. The whip-holder has a tubular upper portion or socket to receive the whip 5, and it has a flattened shank 9, which is secured in the slot 10 at the inner portion thereof by a rivet 11 or other suitable pivot. The guide-pulley, which is grooved to receive an operating-cord 12, is mounted on a suitable spindle or pivot 13, which pierces the sides of the slotted portion of the shaft or support 3. The operating-cord 12, which may consist of a wire, cable, or any other suitable flexible connection, passes around the pulley and is attached at its upper end 14 to the whip-holder, which is preferably provided with a front or outer eye 15 to receive the flexible connection and a rear eye 16 for the attachment of the outer end of a light coiled spring 17. The flexible connection when pulled is adapted to swing the whip downward to positively cause the same to strike an animal, and the light spring 17 is adapted to return the whip to its normal upright position. One of the screw-eyes 15 and 16 may be conveniently employed for clamping the whip in the socket of the holder 4; but any other suitable means may be employed for securing the whip in the holder and for attaching the flexible connection and the coiled spring to the same. The inner end of the coiled spring is connected with an adjusting-screw 18, which is provided at its outer end with an eye and which is engaged by a pair of nuts 19, located at the front and rear faces of the bar or bracket 1. The screw is adapted to be adjusted to vary the tension of the spring. The inner or rear end of the flexible connection, which extends through an opening 20 of the bracket or bar, is provided with a ring 21 or other suitable handle or grip to enable it to be readily grasped by the operator. The ring is designed to be of a size to be grasped by the hand, and it may also be placed on the foot for operation. By these means the whip can be readily applied without releasing the reins.

The horizontal shaft or support 3 is provided with opposite projections formed by a pin 22, which extends through the shaft 3 and which is adapted to engage notches 23 of a ratchet or locking plate or washer 24. The plate or washer 24, which is secured to the bracket or bar 1 by bolts 25, is provided with a projecting flange, which has the said notches 23. The bolts 25 pierce the bracket or bar 1, and the plate or washer 26 is arranged at the inner or rear face of the bracket or bar, as clearly shown in Fig. 2 of the drawings. By this construction the ratchet-plate may be readily applied to the front of a closed or other vehicle when desired. The projections of the shaft 3 are yieldably or detachably held in engagement with the ratchet-plate by means of a coiled spring 27 of sufficient strength to maintain the shaft 3 securely in its adjusted position. The spring 27 is disposed on the inner or rear portion of the shaft 3 and is interposed between the plate or washer 26 and a handle 28; but any other form of stop may be provided for the inner or rear end of the spring. When the shaft 3 is moved forwardly or outwardly, the projections 22 are carried out of engagement with the ratchet-plate, and the said shaft 3 is free to rotate to oscillate the whip laterally for arranging the same in position for engaging either horse of a team. As soon as the whip is properly positioned the spring will move the shaft 3 rearwardly and reëngage the projections thereof with the ratchet-plate. By this construction the whip will be securely locked in its adjusted position, and the driver will be afforded greater freedom to operate the whip and to control the team than is the case where it is necessary for the driver to hold the whip in its adjusted position.

The handle 28 is provided with an opening to receive the rear end of the shaft, which is squared and to which the handle is secured by a screw 29 or other suitable fastening device. When the whip-operating device is applied to a binder, rake, or other agricultural machine, an extension-rod 30 is employed, so as to arrange the whip out of the way of the reel or other mechanism of a machine. The extension-rod 30 is provided at its front end with a socket 31 to receive the squared rear portion of the shaft 3, which is secured to the front end of the extension-rod by a screw 32. The rear end of the extension-rod is provided with a squared portion 33 to adapt it for the reception of the handle 28.

When the device is applied to a hame of a lead-horse, it is reversed, so that the whip will be in proper position for striking the animal. The flexible connection 12 will be removed from the guide-opening of the attachment-bar and will pass around the grooved pulley at the inner side instead of at the outer side, as shown in Fig. 2. The flexible connection will of course be of sufficient length to extend back to the driver.

Having thus fully described my invention, what I claim as new, and desire to secure by Letters Patent, is—

1. A device of the class described, comprising an oscillatory whip-holder, a horizontal shaft capable of rotary movement to swing the whip-holder from one side to the other, means for locking the shaft in its adjustment, and means for oscillating the whip-holder.

2. A device of the class described, comprising a longitudinal shaft forming a rotary support, an oscillatory whip-holder mounted on the shaft and arranged to swing backward and forward, said whip-holder being carried from one side to the other by the rotary movement of the shaft, operating mechanism for oscillating the whip-holder, and means for holding the shaft in its adjustment while the whip-holder is being operated to apply the whip.

3. A device of the class described, comprising a ratchet, a shaft forming a rotary support and provided with means for engaging the ratchet, an oscillatory whip-holder mounted on the shaft, and a spring for maintaining the shaft in engagement with the ratchet.

4. A device of the class described, comprising a ratchet, a shaft capable of rotary movement and provided with means for engaging the ratchet, a coiled spring disposed on the shaft for holding the same in engagement with the ratchet, a handle connected with the shaft for operating the same, and an oscillatory whip-holder mounted on the shaft.

5. A device of the class described, comprising a ratchet having a series of notches, a rotary shaft provided with a projection for engaging the notches of the ratchet, a coiled spring disposed on the shaft in rear of the ratchet and normally maintaining the projection in engagement with the same, a whip-holder mounted on the shaft, and means for operating the whip-holder.

6. A device of the class described, comprising a shaft having an angularly-bent front portion provided with a guide, an oscillatory whip-holder mounted on the shaft in rear of the guide, a flexible connection arranged in the guide and connected with the whip-holder for moving the same in one direction, and a spring for moving the whip-holder in the opposite direction.

7. A device of the class described, comprising a bracket or bar, a shaft mounted on the bracket or bar for rotary adjustment, an oscillatory whip-holder pivoted to the shaft and carried from one side to the other by the rotary adjustment of the same, a spring connected with the bracket or bar and with the whip-holder for swinging the latter in one direction, operating mechanism connected with the whip-holder for swinging the same in the opposite direction, and means for holding the shaft in its adjustment while the whip-holder is being oscillated to apply the whip.

8. A device of the class described, comprising a horizontal shaft having an angularly-disposed slotted outer portion, a whip-holder pivoted at one end in the slot at the inner portion thereof, a guide-pulley mounted on the outer portion of the slot, a spring connected with the whip-holder for moving the same in one direction, and a flexible connection arranged on the guide-pulley and connected with the whip-holder for swinging the latter in the opposite direction.

9. A device of the class described, comprising a horizontal shaft mounted for rotary adjustment, a whip-holder pivotally mounted on the shaft, a spring connected at one end with the whip-holder, an adjusting-screw connected with the other end of the spring, and operating mechanism connected with the whip-holder.

10. A device of the class described, comprising a whip-holder, operating mechanism for oscillating the same to apply a whip, means for swinging the whip-holder from one side to the other to arrange the whip in position for striking either animal of a team, and means for retaining the whip-holder in such adjustment while the same is being operated to apply the whip.

In testimony that I claim the foregoing as my own I have hereto affixed my signature in the presence of two witnesses.

ALEXANDER BURROWS.

Witnesses:
S. B. LITTELL,
CHARLES LOOMIS.